(12) United States Patent
Neilson et al.

(10) Patent No.: US 6,882,770 B2
(45) Date of Patent: Apr. 19, 2005

(54) IMAGING TECHNIQUE FOR USE WITH OPTICAL MEMS DEVICES

(75) Inventors: David Thomas Neilson, Old Bridge, NJ (US); Roland Ryf, Aberdeen, NJ (US)

(73) Assignees: Lucent Technologies Inc., Murray Hill, NJ (US); Agere Systems Inc., Allentown, PA (US)

( * ) Notice: Subject to any disclaimer, the term of this patent is extended or adjusted under 35 U.S.C. 154(b) by 0 days.

(21) Appl. No.: 09/896,085

(22) Filed: Jun. 29, 2001

(65) Prior Publication Data

US 2005/0063641 A1 Mar. 24, 2005

(51) Int. Cl.[7] .............................. G02B 6/26; G02B 6/42
(52) U.S. Cl. .............................. 385/18; 385/16; 385/20; 385/24
(58) Field of Search .................................. 385/14–24

(56) References Cited

U.S. PATENT DOCUMENTS

| | | | | |
|---|---|---|---|---|
| 6,253,001 B1 | * | 6/2001 | Hoen | 385/17 |
| 6,289,145 B1 | * | 9/2001 | Solgaard et al. | 385/17 |
| 6,327,398 B1 | * | 12/2001 | Solgaard et al. | 385/18 |
| 6,330,102 B1 | * | 12/2001 | Daneman et al. | 359/290 |
| 6,385,364 B1 | * | 5/2002 | Abushagur | 385/16 |

FOREIGN PATENT DOCUMENTS

| | | | |
|---|---|---|---|
| CA | 2 325 611 A | 6/2001 | G02B/6/35 |
| WO | 01 71409 A | 9/2001 | G02B/6/35 |

* cited by examiner

*Primary Examiner*—Rodney Bovernick
*Assistant Examiner*—Kevin S. Wood
(74) *Attorney, Agent, or Firm*—E. J. Rosenthal

(57) ABSTRACT

An optical MEMS devices is imaged to a different location at which a second optical MEMS device is located in a manner that effectively combines the tilt angles of at least one micro mirror of each of the first and second optical devices. The imaging system may reproduce the angle of reflection of the light from the first micro mirror. This may be achieved using a telecentric system, also known as a 4 f system, as the imaging system. The physical size of the arrangement may be reduced by compacting the optical path, e.g., using appropriate conventional mirrors, and/or employing folded arrangements, i.e., arrangements in which there is only one MEMS device stage that does double duty for both input and output through the use of at least one conventional mirror.

28 Claims, 2 Drawing Sheets

IMAGING TECHNIQUE FOR USE WITH OPTICAL MEMS DEVICES

TECHNICAL FIELD

This invention relates to the art of optical microelectromechanical systems (MEMS) devices, and more particularly, to all-optical switching using MEMS devices.

BACKGROUND OF THE INVENTION

One solution for all-optical switching employs two MEMS devices each containing an array of tiltable micro mirrors, e.g., small mirrors, which can reflect light, which herein refers to any radiation in the wavelength of interest, whether or not in the visible spectrum. An optical path is established for light supplied from an input source, e.g., an optical fiber, to an output, e.g., an output fiber, by steering the light using a first micro mirror on the first optical MEMS device, the first micro mirror being associated with the input fiber, onto a second micro mirror on the second optical MEMS device which is associated with the output fiber. The second micro mirror then steers the light into the output fiber. Each fiber connected to the system is considered a port of the system, the input fibers being the input ports and the output fibers being the output ports.

A problem in the art of all-optical switching using MEMS devices is that in order to increase number of ports in the system, i.e., the number of fibers, it has been necessary to increase the number of micro mirrors employed to perform the switching function. In the prior art, as noted above, the first optical MEMS device contained all of the first micro mirrors integrated thereon and the second optical MEMS device contained all of the second micro mirrors integrated thereon. Since the size of the optical MEMS device is a direct function of the number of micro mirrors on the optical MEMS device, and the number of micro mirrors required is directly proportional to the maximum number of ports available in the all-optical switch, to increase the maximum number of ports available in the all-optical switch requires one to employ a larger optical MEMS device.

Unfortunately, limitations on manufacturing capability and the large package size have effectively limited the optical MEMS device at the present time to 1296 micro mirrors. Furthermore, even if the size of the micro mirrors could be effectively shrunk, there is still a problem in that there needs to be control signals brought to each micro mirror. These control signals consume large amounts of space on the optical MEMS device, which would thus result in the optical MEMS device being very large. Additionally, there are control signals for each micro mirror that must be brought to the optical MEMS device from off of its substrate. In order to make these connections, additional large amounts of space is required on the optical MEMS device.

As a result of all these space requirements, the optical MEMS chip is quite large, and so, due to the manufacturing capability limits, the number of micro mirrors that can be placed on a single optical MEMS device is limited. The limitation on the number of micro mirrors, in turn, limits the number of ports of an all-optical switch.

Additionally, the micro mirrors presently available have a limited effective range through which they can be tilted. The limitation on the effective range further limits the number of ports that can be implemented in an all-optical switch employing such optical MEMS devices because each micro mirror on the first optical MEMS device must be able to direct the light incident on it to each of the micro mirrors on the second optical MEMS device. The ability to so direct the light is a function of the effective tilt range of the micro mirrors. In other words, greater effective tilt angle allows each micro mirror to direct its light over a greater area. For optical MEMS devices arranged as an optical switch the greatest tilt angle required is for connections between micro mirrors in the opposing corners of the optical MEMS devices. For example, the most tilt is required by a micro mirror at the top right of the first MEMS device which must direct its light to a micro mirror at the bottom left of the second MEMS device. Thus, the size of the micro mirror array that can be employed in an optical switch is limited by the effective tilt range of its optical MEMS devices.

While increasing the separation distance between the two optical MEMS devices decreases the required tilt angle, which would allow the use of larger micro mirror arrays without changing the effective tilt range of the micro mirrors, doing so suffers from the disadvantage that it increases the beam diffraction, which thus requires the use of a micro mirror with a larger diameter or results in a loss of some of the light. Since using a larger micro mirror with present technology requires additional space, doing so increases the distance between the micro mirrors on the optical MEMS device, which further increases the size of the optical MEMS device for the same number of micro mirrors. As a result of increasing the size of the optical MEMS device, a greater tilt angle is required to couple the opposing corners of the opposing optical MEMS devices. Thus, essentially, additional separation of the opposing optical MEMS devices does not help to increase the number of ports due to the limited available tilt angle.

SUMMARY OF THE INVENTION

We have recognized that the limitations on the number of ports in an all-optical switch due to the constraints on the size and/or effective tilt range of the optical MEMS devices can be overcome when a large enough micro mirror array can be constructed but the tilt angle available is insufficient so that not all of the micro mirrors can be coupled together, by imaging at least a portion of one of the optical MEMS devices to a different location at which a second optical MEMS device is located in a manner that effectively combines the tilt angles of at least one micro mirror of each of the first and second optical devices. In one embodiment of the system, the imaging system reproduces the angle of reflection of the light from the first micro mirror, which may be achieved using a telecentric system, also known as a 4 f system. The physical size of the arrangement may be reduced by compacting the optical path, e.g., using appropriate conventional mirrors, and/or employing folded arrangements, i.e., arrangements in which there is only one MEMS device stage that does double duty for both input and output through the use of at least one conventional mirror.

In one embodiment of the invention, in order to create an optical switch with a larger apparent tilt angle, a first input optical MEMS device is imaged using a telecentric system onto a second input optical MEMS device so that the angles of reflection are added. The light reflected from the second input optical MEMS device is then supplied to an at least third output MEMS device. The third MEMS output device may in turn be imaged by a telecentric system onto a fourth output MEMS device.

In another embodiment of the invention, a folded system may be achieved using only two MEMS devices. The ports of the first MEMS device is allocated between input and output ports. The first MEMS device is imaged using a telecentric system onto a second MEMS device so that the angles of reflection are added. The light from the second MEMS device is bounced off a conventional mirror back toward the second MEMS device. The combined angle of the micro mirrors which reflected the light determines which micro mirror will receive the light after it bounces off of the conventional mirror. The micro mirror that receives the light after it bounces off of the conventional mirror in turn passes the light back through the imaging system to the first MEMS device, and the micro mirror thereon to which it is directed steers the light to an output port. Again, the angles of reflection between the second and first micro mirrors is additive.

The overall system is arranged to account for inversion of any images of the MEMS devices.

Advantageously, increasing the effective angle enables full connectivity between all available input and output ports of a switch that is made from MEMS devices with micro mirror arrays that are so large that not all of the micro mirrors on the input MEMS device could otherwise be coupled to all of the micro mirrors of the output MEMS device using the basic tilt angle of the MEMS device.

DETAILED DESCRIPTION

Figure 1:
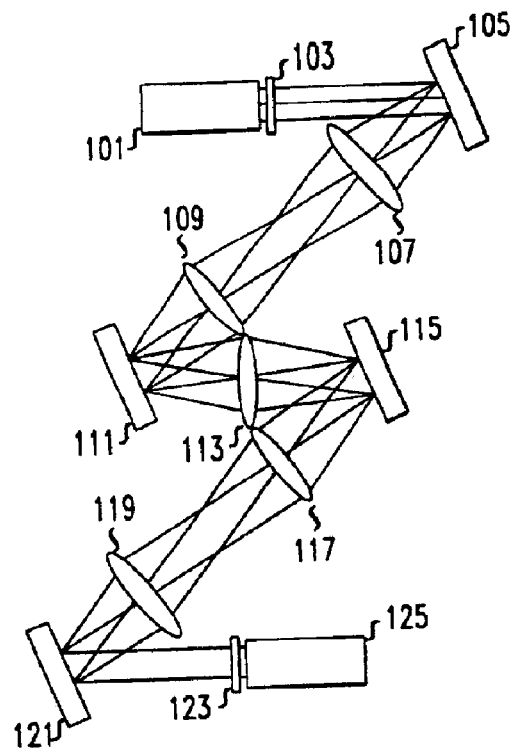
FIG. 1 shows an exemplary arrangement for performing optical switching in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any, functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware which is expressly or implicitly shown.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

FIG. 1 shows an exemplary arrangement for performing optical switching in accordance with the principles of the invention. Shown in FIG. 1 are a) input fiber bundle 101, b) input micro lens array 103, c) first input MEMS device 105, d) lens 107, e) lens 109, f) second input MEMS device 111, g) field lens 113, h) first output MEMS device 115, i) lens 117, j) lens 119, k) second output MEMS device 121, l) output micro lens array 123, and m) output fiber bundle 125.

Input fiber bundle 101 supplies optical signals to be switched. More specifically, each fiber of input fiber bundle 101 is an input port to the switching system of FIG. 1. The light supplied by each fiber of fiber bundle 101 passes through a respective corresponding micro lens that is part of micro lens array 103. The function of each micro lens is to collimate the beam of light supplied from its respective associated input fiber. In alternative embodiments of the invention, in lieu of employing a separate micro lens array, a lens may be integrated with each fiber of fiber bundle 101 in an arrangement that forms a collimator.

The beams of light passing from micro lens array 103 each falls upon a respective micro mirror of first input MEMS device 105. Each micro mirror of first input MEMS device 105 is set to reflect the beam of light incident on it at a respective prescribed angle. The particular prescribed angle is selected so that in combination with the angle of a corresponding respective micro mirror of second input MEMS device 111 an overall desired angle is obtained. In the event that there is more than one combination of angles that can be used to achieve the overall desired angle, in one embodiment of invention the minimum angles are used for each micro mirror. This is because using current electrostatic angle control technology the function of tilt given a particular control voltage is highly non-linear. Thus, requiring less tilt tends to yield a more accurate achieving of the angle desired.

After reflecting off of its particular micro mirror, each beam of light passes through lens 107, then lens 109 to a respective micro mirror of second input MEMS device 111. Lens 107 and lens 109 are arranged to form an imaging system. The imaging system is arranged so that the angles of each micro mirror of first input MEMS device 105 combines with a corresponding respective micro mirror of second input MEMS device 111. Note that although two lenses are shown making up the imaging system, this is for pedagogical and clarity purposes only. Those of ordinary skill in the art will readily appreciate that any imaging system, e.g., a system using one or more lenses, may be employed.

In one embodiment of the invention the imaging system formed by lenses 107 and 109 is a telecentric system, also known as a 4 f system. By using a telecentric system, such systems being well known in the art, the angle of reflection of the light of each beam from first input MEMS device 105 is reproduced when that light reaches second input MEMS device 111, so that the tilt angles of each of the of the first input MEMS device 105 and the respective corresponding micro mirrors of second input MEMS device 111 are combined. Note that since the telecentric system may be inverting the respective corresponding micro mirrors of second input MEMS device 111 may not be in the exact same location as they are in first input MEMS device 105.

Given the particular imaging system employed, it is necessary to determine the appropriate angles for each respective corresponding micro mirror to achieve the combined micro mirror tilt. Those of ordinary skill in the art will be able to develop the necessary control algorithms as a function of the particular imaging system they select to employ. In the embodiment of the invention employing a telecentric imaging system, the angles are directly additive.

Note that the imaging system may also change the size of the image as compared with the original. This would allow the micro mirrors of second input MEMS device 111 to be a different size that those of first input MEMS device 105, as well as allowing the micro mirror spacing of second input MEMS device 111 to be a different than that of first input MEMS device 105. Furthermore, it is possible to employ optical splitters, e.g., between lenses 107 and 109, to create multiple signal paths through the system, e.g., to implement a multicast, broadcast, monitoring, protection and restoration functions. Advantageously, great flexibility in system design is achieved.

After reflecting off the respective micro mirrors of second input MEMS device 111, the light passes through optional field lens 113 on its way to first output MEMS device 115. Optional field lens translates the angle at which the light is incident onto each micro mirror into a position to which the light will be directed. This allows all the combinations of input micro mirrors to be homogenized, in that all combinations of micro mirrors having the same total tilt will direct their light to the same position. Furthermore, the field lens refocuses each of the beams that pass through it, thus reducing loss.

The beams of light passing from field lens 113 each falls upon a respective micro mirror of first output MEMS device 115. Each micro mirror of first output MEMS device 115 is set to reflect the beam of light incident on it at a respective prescribed angle. The particular prescribed angle is selected so that in combination with the angle of a corresponding respective micro mirror of second output MEMS device 121 an overall desired angle is obtained. In the event that there is more than one combination of angles that can be used to achieve the overall desired angle, in one embodiment of invention the minimum angles are used for each micro mirror, for the same reason given hereinabove, with regard to the input MEMS devices.

After reflecting off of its particular micro mirror, each beam of light passes through lens 117, then lens 119 to a respective micro mirror of second output MEMS device 121. Similar to lens 107 and 109, Lens 117 and lens 119 are arranged to form an imaging system. The imaging system is arranged so that the angles of each micro mirror of first output MEMS device 115 combines with a corresponding respective micro mirror of second output MEMS device 121. As previously indicated in connection with the lenses of the input imaging system, although two lenses are shown making up the imaging system, this is for pedagogical and clarity purposes only. Those of ordinary skill in the art will readily appreciate that any imaging system, e.g., a system using one or more lenses, may be employed. In one embodiment of the invention the imaging system formed by lenses 115 and 119 is a telecentric system.

By using a telecentric system, such systems being well known in the art, the angle of reflection of the light of each beam from first output MEMS device 115 is reproduced when that light reaches second output MEMS device 121 so that the tilt angles of each of the of the first output MEMS device 115 and the respective corresponding micro mirrors of second output MEMS device 121 are combined. Note that since the telecentric system may be inverting the respective corresponding micro mirrors of second output MEMS device 121 may not be in the exact same location as they are in first output MEMS device 115.

Given the particular imaging system employed, it is necessary to determine the appropriate angles for each respective corresponding micro mirror to achieve the combined micro mirror tilt. Those of ordinary skill in the art will be able to develop the necessary control algorithms as a function of the particular imaging system they select to employ. In the embodiment of the invention employing a telecentric imaging system, the angles are directly additive.

Note that the imaging system may also change the size of the image as compared with the original. This would allow the micro mirrors of second output MEMS device 121 to be a different size that those of first output MEMS device 115, as well as allowing the micro mirror spacing of second output MEMS device 121 to be a different than that of first output MEMS device 115. Furthermore, it is possible to employ optical splitters, e.g., between lenses 117 and 119, to create multiple signal paths through the system, e.g., to implement a multicast, broadcast, monitoring, protection and restoration functions. Advantageously, great flexibility in system design is achieved.

The beams of light passing from each micro mirror of second output MEMS device 121 passes through a respective micro lens of micro lens array 123. The function of each micro lens is to couple the light beam into its respective associated output fiber. In alternative embodiments of the invention, in lieu of employing a separate micro lens array, a lens may be integrated onto each output fiber of fiber bundle 125, in an arrangement that forms a collimator. The light from each of micro lens of micro lens array 123 then passes into the respective output fiber bundle that is associated with the micro lens.

Figure 2:
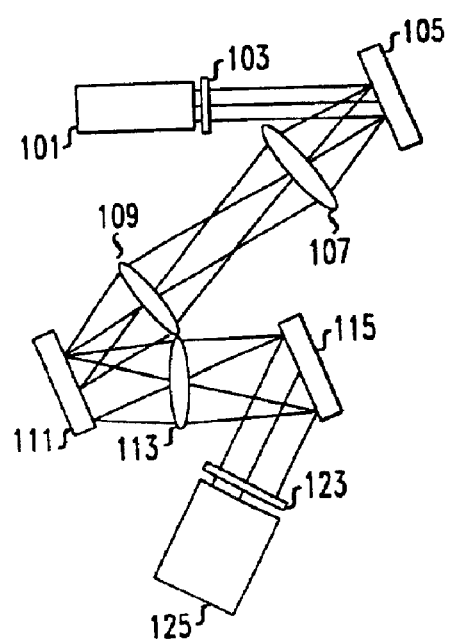
FIG. 2 shows an embodiment of the invention in which only one imaging system need be employed.
Figure 3:
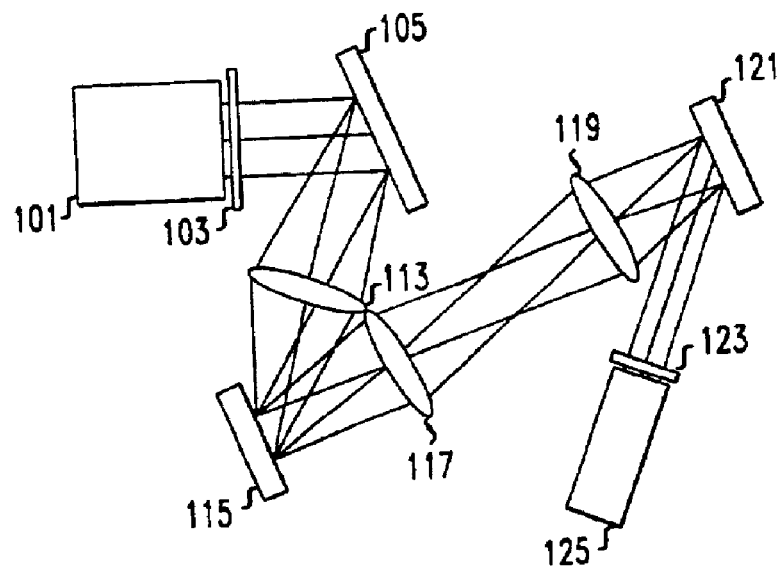
FIG. 3 shows another embodiment of the invention in which only one imaging system need be employed.

Note that in some embodiments of the invention only one imaging system need be employed. In such embodiments the imaging system may be employed only for the input or only for the output. Such an embodiment is shown in FIG. 2, which is the same basic arrangement as FIG. 1 but in which the output imaging system made up of lenses 117 and 119 has been eliminated. Second output MEMS device 121 of FIG. 1 is not required and the entire output switching function is performed by first output MEMS device 115. Similarly, FIG. 3 shows an embodiment of the invention as FIG. 1 but in which the input imaging system made up of lenses 107 and 109 has been eliminated. First input MEMS device 105 of FIG. 1 is not required and the entire input switching function is performed by second input MEMS device 111.

Such embodiments are particularly useful when the number of input ports and the number of output ports are not the same, in that the allow the use of a MEMS devices with a smaller number of mirrors and an imaging system with a MEMS device having a larger number of mirrors without the imaging system such that had both the input and output MEMS devices been used alone without any imaging system and at the same size as the larger MEMS device each possible mirror on the opposing MEMS device could not have been addressed. However, by employing the imaging system, the smaller MEMS devices in combination are able to achieve a greater tilt angle, which allows all of the micro mirror positions on the input and output side to address each other in any combination.

In an alternative embodiment of the invention, one of the MEMS device of any pair, i.e., two MEMS devices coupled optically to add their tilt, e.g., an input pair or an output pair, is arranged to be either flat or maximally tilted around any of its tilt axes. In such an arrangement, the fine control comes from its paired mirror, while the limited control mirror acts essentially as a booster. Note that, as will be readily appreciated by those of ordinary skill in the art, each corresponding micro mirror of a pair may be arranged to effectively contribute differently to the overall angle change of the beam effectuated by the pair. Furthermore, the imaging system between the input pair or output pair can be arranged so that even for the same change in mirror tilt a different effective contribution for each micro mirror of a pair is achieved.

In another embodiment of the invention, each mirror of a pair of mirrors is substantially limited to tilting around only one tilt axis. The axis around which the mirrors of the first MEMS device can tilt is substantially orthogonal to the axis of the second MEMS device. Such an arrangement enables the number of electrical connections on the package to be reduced by one half, which allows for a greater number of mirrors to be constructed on a same-sized substrate. Additionally, a gimbal employed to give each of the mirrors two tilt axes may be eliminated. The space of the gimbal may then be reclaimed to form larger micro mirrors. Furthermore, the activation voltages of the mirror may also be reduced because additional surface area is available for applying the activation voltages. If it is not desired to decrease the activation voltages, the angle at which the micro mirror may tilt around its one tilt axis may be increased as compared to a mirror that tilts around two tilt axes, since it is possible to increase the distance between the electrodes and the micro mirror while using the same activation voltage given the greater electrode size.

If multiple wavelengths of light are transmitted via any input port they will all pass together through the system to the corresponding output port.

Figure 4:
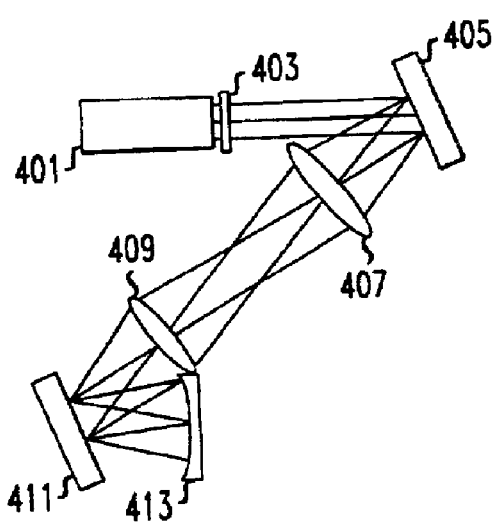
FIG. 4 shows an exemplary embodiment of the invention in which the system is folded.

FIG. 4 shows another exemplary embodiment of the invention in which the system is folded. To this end, fiber bundle 401 contains both input and output fibers, so that fiber bundle 401 acts as both input and output ports. Light from input fibers pass through a respective associated micro lens of micro lens array 403. The light is reflected off a corresponding associated micro mirror of first MEMS device 405 and passes through an imaging system which is made up of lenses 407 and 409 in FIG. 4. As noted hereinabove, although two lenses are shown making up the imaging system, this is for pedagogical and clarity purposes only. Those of ordinary skill in the art will readily appreciate that any imaging system, e.g., a system using one or more lenses, may be employed. In one embodiment of the invention, a telecentric system is employed as the imaging system.

The beams of light from the imaging system are reflected by a respective micro mirror of second MEMS device 411 toward mirror 413. Mirror 413 is a conventional mirror which may be flat, functioning as a planar mirror, or it may be curved, to incorporate the function previously performed by the field lens. The beams of light are reflected back by mirror 413 toward MEMS device 411 as return beams each of which is incident at MEMS device 411 upon one of the micro mirrors thereof. Typically the return beams are incident upon a different micro mirror than the micro mirror that initially reflected them towards mirror 413, but this is not a requirement, and for any input beam of light the return beam may indeed be incident the same micro mirror from which it was reflected towards mirror 413. Doing so enables any fiber in the fiber bundle to be connected to any other fiber in the fiber bundle, including itself.

Each return beam then passes through the imaging system to first MEMS device 405, where it is reflected by the respective corresponding micro mirror of first MEMS device 405 toward the fiber of fiber bundle 401 that is to act as the output port for the beam. After being reflected from the micro mirror, but prior to entering the fiber, the beam passes through the micro lens of micro lens array 403 that is associated with the fiber that is acting as the output port for the beam.

Note that instead of optical fibers supplying the light beams as inputs, they may be supplied by an optical source, e.g., a laser or light emitting diode, planar wave guides, or the like. Likewise, instead of having optical fibers receiving the light beams as outputs the light beams could be received by other receivers such as photo detectors, planar wave guides, or the like.

What is claimed is:

1. An optical switch, comprising
a first micro-electro mechanical system (MEMS) device containing a first number of micro mirrors tiltable about at least a first axis;
a second micro-electromechanical system (MEMS) device containing a second number of micro mirrors tiltable about at least said first axis; and
a first imaging system optically coupled to said first MEMS device so as to produce an image of each of said micro mirrors of said first MEMS device on a corresponding micro mirror of said second MEMS device;
so that at least one of said micro mirrors of said first MEMS device is grouped by said first imaging system with at least one of said micro mirrors of said second MEMS device such that the angle of reflection from said at least one grouped micro mirror of said first MEMS device and the angle of reflection from said at least one grouped micro mirror of said second MEMS device combine to produce an overall effective angle about said first axis for said group which is different than either the angle of reflection from said at least one grouped micro mirror of said first MEMS device and the angle of reflection from said at least one grouped micro mirror of said second MEMS device when neither one of the angle of reflection from said at least one grouped micro mirror of said first MEMS device and the angle of reflection from said at least one grouped micro mirror of said second MEMS device is zero.

2. The invention as defined in claim 1 wherein said first number and said second number are the same.

3. The invention as defined in claim 1 further comprising a plurality of optical source coupled to supply input light to said first MEMS device.

4. The invention as defined in claim 1 further comprising a plurality of optical source coupled to supply input light to said first MEMS device, wherein at least one of said optical sources are one of the group consisting of an optical fiber, a laser, a light emitting diode, light source, and a planar wave guide.

5. The invention as defined in claim 1 further comprising a receiver coupled to receive output light from said second MEMS device.

6. The invention as defined in claim 1 further comprising a receiver coupled to receive output light from said second MEMS device, each of said receiver being one of the group consisting of an optical fiber, a photo detector, and a planar wave guide.

7. The invention as defined in claim 1 wherein said first imaging system reproduces an angle of reflection of the light from each of said micro mirrors of said first MEMS devices.

8. The invention as defined in claim 1 wherein said overall effective angle for said group is a sum of said angle of reflection from each of said micro mirrors of said group.

9. The invention as defined in claim 1 further comprising a field lens for receiving light reflected by said second MEMS device.

10. The invention as defined in claim 1 further comprising a field lens through which light passes prior to being incident onto said first MEMS device.

11. An optical switch, comprising
a first micro-electro mechanical system (MEMS) device containing a first number of micro mirrors;
a second micro-electromechanical system (MEMS) device containing a second number of micro mirrors; and
a first imaging system optically coupled to said first MEMS device so as to produce an image of each of said micro mirrors of said first MEMS device on a corresponding micro mirror of said second MEMS device; and
a mirror for receiving light reflected by said second MEMS device and reflecting said light back toward said second MEMS device;
whereby at least one of said micro mirrors of said first MEMS device is grouped with at least one of said micro mirrors of said second MEMS device such that the angle of reflection from said at least one grouped micro mirror of said first MEMS device and the angle of reflection from said at least one grouped micro mirror of said second MEMS device combine to produce an overall effective angle for said group.

12. The invention as defined in claim 11 wherein said mirror is of a type selected from the group of types consisting of: planar and curved.

13. The invention as defined in claim 1 wherein said first number of micro mirrors and said second number of micro mirrors are the same.

14. The invention as defined in claim 1 wherein said first number of micro mirrors and said second number of micro mirrors are different.

15. The invention as defined in claim 1 wherein the size of said micro mirrors of said first device is the same as the size of said micro mirrors of said second device.

16. The invention as defined in claim 1 wherein the size of said micro mirrors of said first device is different than the size of said micro mirrors of said second device.

17. The invention as defined in claim 1 wherein said imaging system is a telecentric system.

18. The invention as defined in claim 1 further comprising
a third micro-electromechanical system (MEMS) device containing a third number of micro mirrors;
a fourth micro-electromechanical system (MEMS) device containing a fourth number of micro mirrors; and
a second imaging system optically coupled to said third MEMS device so as to produce an image of each of said micro mirrors of said third MEMS device on a corresponding micro mirror of said fourth MEMS device;
whereby at least one of said micro mirrors of said third MEMS device is grouped with at least one of said micro mirrors of said fourth MEMS device such that the angle of reflection from said at least one grouped micro mirror of said third MEMS device and the angle of reflection from said at least one grouped micro mirror of said fourth MEMS device combine to produce an overall effective angle for said group of micro mirrors of said third and fourth MEMS devices.

19. The invention as defined in claim 1 further comprising:
   a third micro-electromechanical system (MEMS) device containing a third number of micro mirrors;
   and wherein light reflected by said micro mirrors of said second MEMS device is coupled to said third MEMS device.

20. The invention as defined in claim 1 wherein said first MEMS device is arranged to act as a booster.

21. The invention as defined in claim 1 wherein each of said grouped micro mirrors effectively contribute different angles to said overall effective angle for said group.

22. The invention as defined in claim 1 wherein one of each of said grouped micro mirrors effectuates coarse tilt and the other effectuates fine control.

23. A method for operating an optical switch including a first micro-electromechanical system (MEMS) device containing a first number of micro mirrors tiltable about at least a first axis, a second micro-electromechanical system (MEMS) device containing a second number of micro mirrors tiltable about at least said first axis, the method comprising the step of:
   imaging said first optical MEMS device onto said second optical MEMS device so that the angle of reflection from at least one micro mirror of said first optical MEMS device and the angle of reflection from at least one micro mirror of said second MEMS device combine to produce an overall effective angle about at least said first axis when considering said least one micro mirror of said first optical MEMS device and said at least one micro mirror of said second MEMS device as a group, said overall effective angle being different than either the angle of reflection from said at least one grouped micro mirror of said first MEMS device and the angle of reflection from said at least one grouped micro mirror of said second MEMS device when neither one of the angle of reflection from said at least one micro mirror of said first MEMS device and the angle of reflection from said at least one micro mirror of said second MEMS device that are being combined is zero.

24. The invention as defined in claim 23 further comprising the step of passing light from said second optical MEMS device through a field lens.

25. The invention as defined in claim 23 further comprising the step of receiving light from a field lens at said first optical MEMS device.

26. The invention as defined in claim 23 further comprising the step of coupling light passed from a fiber at said first optical MEMS device.

27. The invention as defined in claim 23 further comprising the step of coupling light from said second optical MEMS device to a fiber.

28. An optical switch, comprising
   a first micro reflective means mounted on a first micro-electromechanical system (MEMS) means tiltable about at least a first axis;
   a second micro reflective means mounted on a second micro-electromechanical system (MEMS) means tiltable about at least said first axis;
   a first imaging means optically arranged to produce an image of said first micro reflective means at said second micro reflective means such that the angle of reflection of said first micro reflective means and the angle of reflection from said second micro reflective means combine about said first axis to produce an overall effective reflective angle that is different than either the angle of reflection of said first micro reflective means and the angle of reflection from said at least second micro reflective means when neither one of the angle of reflection from said first micro reflective means and the angle of reflection from said second micro reflective means is zero.

* * * * *